Dec. 17, 1957 — M. M. MARTINEZ — 2,816,319
SEAFOOD PROCESSING APPARATUS
Filed June 26, 1956 — 3 Sheets-Sheet 1

INVENTOR
Melroy M. Martinez
BY Kimmel & Crowell
ATTORNEYS

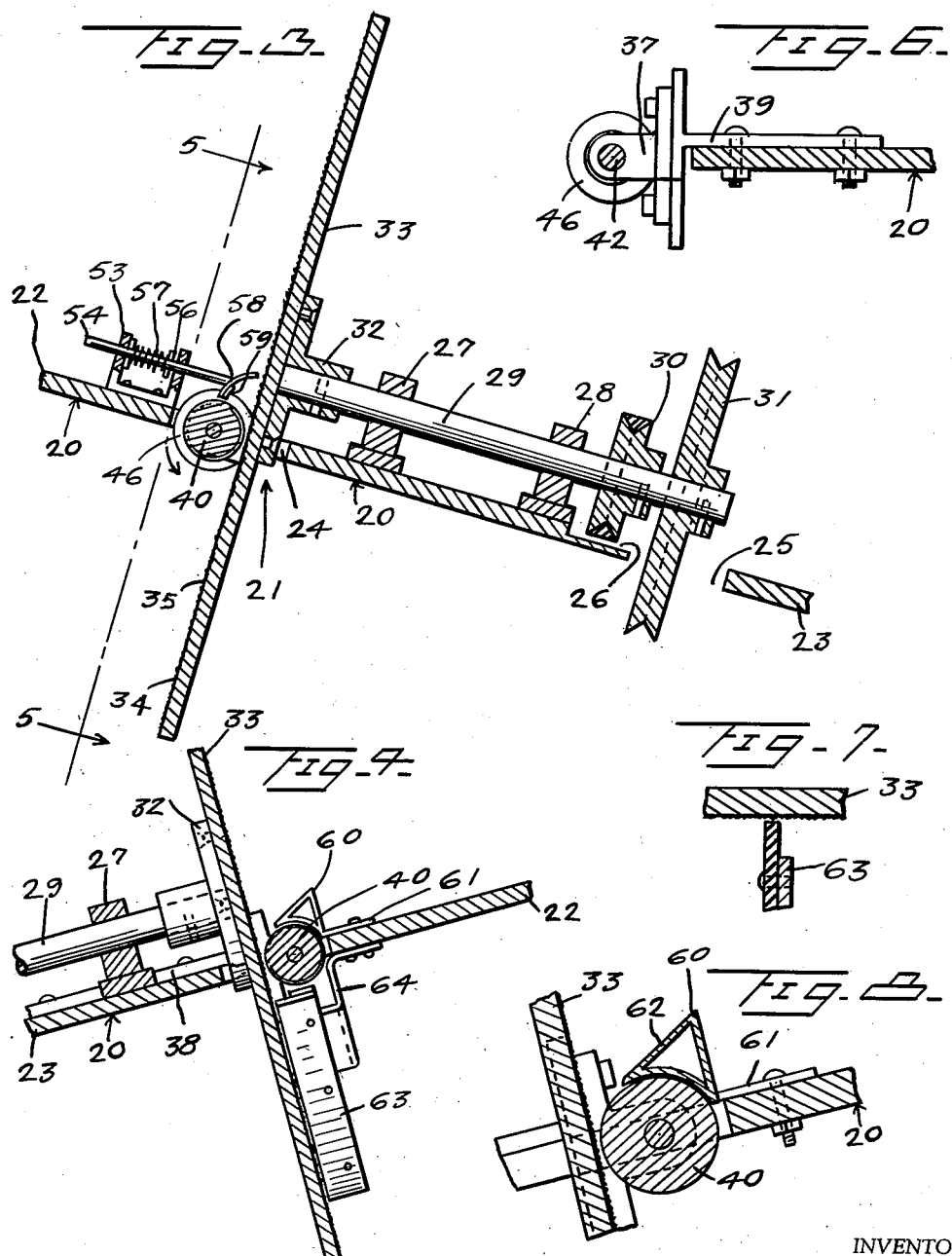

Dec. 17, 1957 M. M. MARTINEZ 2,816,319
SEAFOOD PROCESSING APPARATUS
Filed June 26, 1956 3 Sheets-Sheet 3
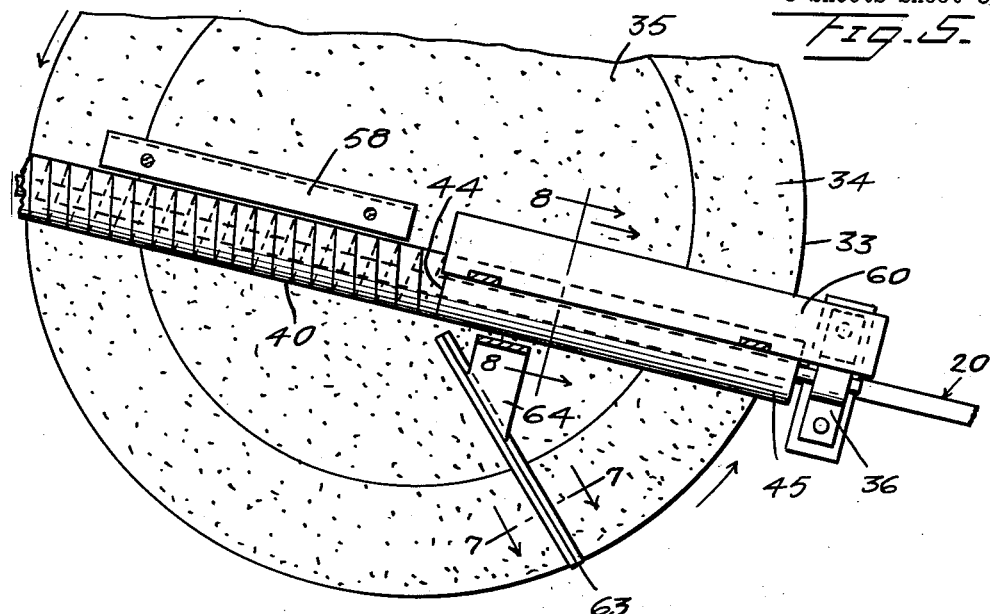
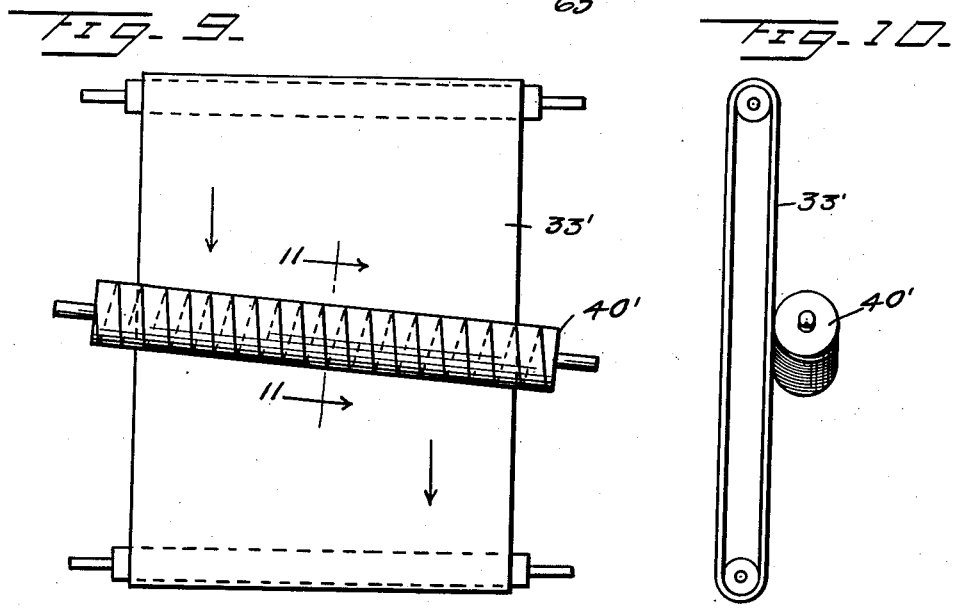
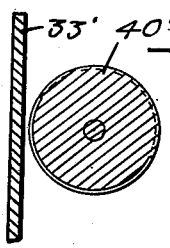
INVENTOR.
Melroy M. Martinez
BY Kimmel & Crowell
ATTORNEYS

# United States Patent Office 2,816,319
Patented Dec. 17, 1957

2,816,319

SEAFOOD PROCESSING APPARATUS

Melroy M. Martinez, New Orleans, La.

Application June 26, 1956, Serial No. 593,960

3 Claims. (Cl. 17—2)

The present invention relates to seafood processing apparatus, and more particularly to apparatus for deshelling, deheading, and cleaning shrimp and similar seafood products.

The primary object of the invention is to provide apparatus for processing seafood which will, in the case of shrimp, remove the legs, shell, head, and clean the shrimp to produce a marketable product.

Another object of the invention is to provide apparatus for processing seafood which is completely automatic in its processing steps, requiring no hand manipulation.

A further object of the invention is to provide an apparatus for processing shrimp which operates under a cleansing water spray to assist in cleaning the shrimp as well as maintaining the apparatus in a clean condition.

A still further object of the invention is to provide a seafood processing apparatus which will automatically feed the seafood through the processing portions of the apparatus without requiring the use of special conveyors.

Another object of the invention is to provide a seafood processing apparatus of the class described above which is inexpensive to manufacture, simple to use and operate, and completely effective in its action.

Other objects and advantages will become apparent in the following specification when considered in the light of the attached drawings, in which:

Figure 3 is an enlarged fragmentary transverse cross-section taken along the line 3—3 of Figure 1, looking in the direction of the arrows.

Figure 4 is an enlarged fragmentary transverse cross-section taken along the line 4—4 of Figure 1, looking in the direction of the arrows.

Figure 5 is an enlarged fragmentary longitudinal cross-section taken along the line 5—5 of Figure 3, looking in the direction of the arrows.

Figure 6 is an enlarged fragmentary transverse cross-section taken along the line 6—6 of Figure 1, looking in the direction of the arrows.

Figure 7 is an enlarged fragmentary lateral cross-section taken along the line 7—7 of Figure 5, looking in the direction of the arrows.

Figure 8 is an enlarged fragmentary transverse cross-section taken along the line 8—8 of Figure 5, looking in the direction of the arrows.

Figure 9 is a front elevation of a modified form of the invention shown fragmentarily.

Figure 10 is a fragmentary side elevation of the modification illustrated in Figure 9.

Figure 11 is an enlarged fragmentary vertical cross-section taken along the line 11—11 of Figure 9, looking in the direction of the arrows.

Figure 1:
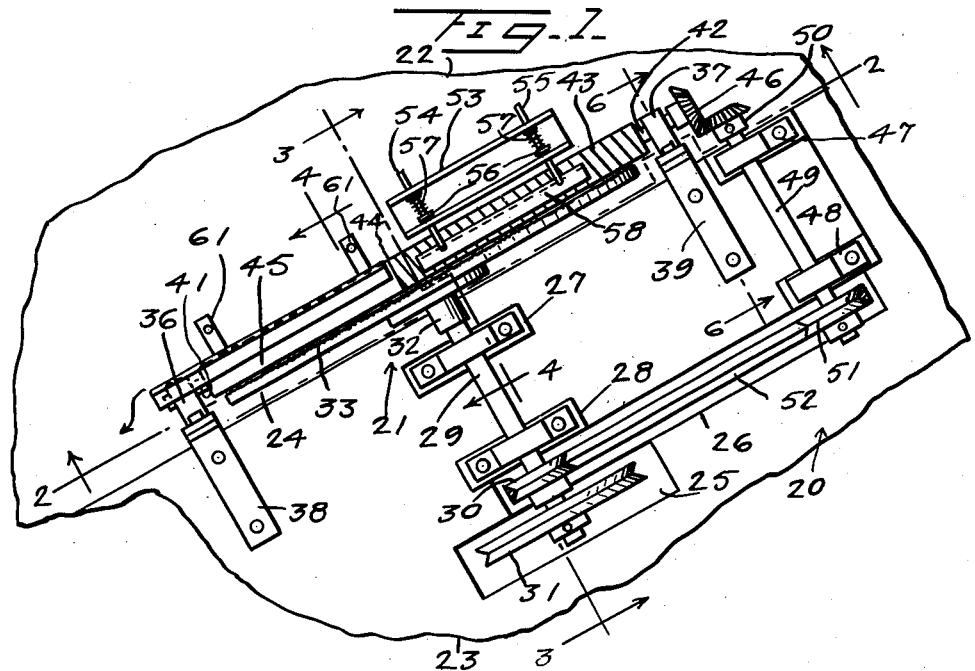
Figure 1 is a top plan view of the invention with the mounting table therefor shown fragmentarily.
Figure 2:
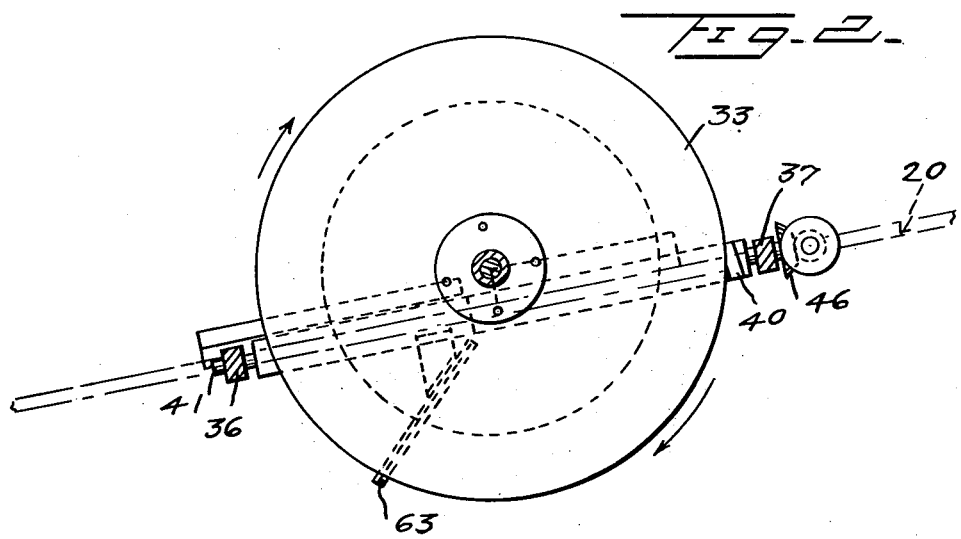
Figure 2 is a fragmentary longitudinal cross-section taken along the line 2—2 of Figure 1, looking in the direction of the arrows.

Referring now to the drawings in detail wherein like reference characters indicate like parts throughout the several figures, the reference numeral 20 indicates generally a table upon which my new and improved seafood processing apparatus, generally indicated at 21, is mounted.

The table 20 slopes from a higher portion 22 to a lower portion 23 to assist in the operation of the apparatus 21 as will be hereinafter described. The table 20 is provided with a generally rectangular slot 24 extending at an angle thereacross and a second rectangular slot 25 positioned in spaced parallel relation to the rectangular slot 24. The slots 24 and 25 extend completely through the table 20, for reasons to be assigned. The slot 25 is somewhat shorter than the slot 24 and has adjacent thereto a groove 26 formed in the upper surface of the table 20 and extending parallel to the slots 24 and 25.

A pair of bearing blocks 27 and 28 are secured in axial alignment to the table 20 between the slots 24 and 25. A shaft 29 is journalled in the bearing blocks 27 and 28 with the shaft 29 extending perpendicularly to the slots 24 and 25. A pulley wheel 30 is secured to the shaft 29 adjacent the bearing block 28. A second pulley 31 is mounted on the end of the shaft 29 adjacent the pulley wheel 30. The pulley wheel 31 is somewhat larger than the pulley wheel 30 and extends through the slot 25, as best seen in Figure 3.

A hub 32 is mounted on the shaft 29 opposite to the pulley wheel 31 and has a disc 33 secured thereto so as to extend downwardly through the slot 24. The surface of the disc 33 opposite the hub 32 is provided along its outer peripheral portions with a relatively coarse abrading material 34. The central portion of the face of the disc 33 inwardly of the coarse abrading covered material 34 is coated with a relatively fine abrasive material 35.

A pair of bearing blocks 36 and 37 are positioned adjacent the table 20 at opposite sides of the disc 33 and supported on the table 20 by means of brackets 38 and 39. A metal shaft 40 has a reduced end portion 41 thereof journalled in the bearing 36 and a reduced opposite end portion 42 thereof journalled in the bearing 37. The shaft 40 is positioned in spaced relation to the disc 33 and extends thereacross at an angle due to the slope of the table 20, as can be seen in Figure 5.

The shaft 40 is knurled as at 43 from the end thereof carrying the reduced end portion 42 to a point 44 a little beyond the center point of the shaft 40. The remaining surface of the shaft 40 is smooth as at 45. A bevelled gear 46 is secured to the reduced end portion 42 of the shaft 40 beyond the bearing block 37.

A pair of bearing blocks 47 and 48 are secured to the table 20 in axially aligned relation with their axes parallel to the axes of the bearing blocks 27 and 28. A shaft 49 is journalled in the bearing blocks 47 and 48 with a bevelled gear 50 secured to one end thereof in meshing relation to the bevelled gear 46. A pulley 51 is secured to the opposite end of the shaft 49 in aligned relation to the pulley 30. A belt 52 connects the pulleys 30 and 51 in driving relation. The groove 26 in the table 20 provides space for the belt 52, pulley 30, and pulley 51, as illustrated in Figures 1 and 3.

A bracket 53 is secured to the table 20 and has slidably supported therein a pair of mounting rods 54 and 55. The mounting rods 54 and 55 are positioned in spaced parallel relation and parallel to the table 20. Each of the mounting rods 54 and 55 have secured thereto a washer 56 which is adapted to engage against one side of the bracket 53 in which position it is normally maintained by a coil spring 57 acting against the washer 56 and the opposite side of the bracket 53. The mounting rods 54 and 55 have secured to their ends adjacent the disc 33 a curved plate 58 having secured to the bottom edge thereof a rubber bar 59 which engages lightly against the shaft 40.

A guide plate 60 is supported on brackets 61 on the table 20 and is positioned in generally aligned but laterally spaced relation to the curved plate 58. The guide plate 60 is spaced from the shaft 40 a slight distance and is provided with an upper wall 62 which slopes downwardly toward the disc 33, as best seen in Figure 8.

A cleaning brush 63 is mounted beneath the table 20 by means of a bracket 64, as seen in Figure 4, and is so arranged to lightly contact the disc 33. The cleaning brush 63 extends at a substantial angle to the vertical, as best illustrated in Figure 5.

In the use and operation of the preferred form of the invention illustrated in Figures 1 through 8, the disc 33, as viewed in Figure 5, rotates counter-clockwise while the shaft 40 rotates so that the surface 43 thereof throughout the major portion of its length will be moving oppositely to the abrading surfaces 34 and 35 of the disc 33, while the remaining smooth portion of the shaft 40 lying beyond the center of the disc 33 will have its surface moving in the same direction as the surface of the disc 33.

Shrimp or other seafood is introduced onto the shaft 40 at the end thereof having the reduced end portion 42 from any suitable chute or conveyor (not shown) and with the action of the disc 33, coupled with the action of the shaft 40, the shrimp will be held against both while traveling along the shaft 40 toward the end carrying the reduced end portion 41 thereof. The shrimp will pass under the curved plate 58 which acts to maintain the shrimp in correct relation with respect to the disc 33 and the shaft 40. A spray of water constantly impinges against the shrimp, the shaft 40, and the disc 33 to assist in the cleaning action.

The combined action of the shaft 40, the disc 33, and the water causes the shrimp to lie lengthwise from head to tail touching both the rotating disc 33 and the rotating shaft 40. The downward motion of the rotating disc 33 and the upward motion of the rotating shaft 40 creates a rolling, squeezing, grabbing, or shearing action on the hull or shell of the shrimp. The rolling action loosens the meat from the inside of the shell and causes a crushing action on the larger hollow head section. The downward abrasive action of the abrasive surface 34, traveling approximately three times faster than the upward rolling motion of the shaft 40, shears off the legs of the shrimp and grabs the shell tearing it open and away from the meat.

The shrimp moves from left to right, as viewed in Figure 5, along the downward slope of the rotating shaft 40 assisted by the flow of water and the rotating disc 33. The shrimp meats are gradually moved inwardly of the disc 33 to the portion thereof having the fine abrasive coating 35 thereon. Along this portion of the disc 33 the surface thereof is moving approximately two and one-half times faster than the shaft 40. The finer abrasive action of the abrasive coating 35 removes the disengaged clinging hulls from the meat of the shrimp which are carried away between the disc and the shaft, passing through the currents existing therebetween. The shrimp shells, heads, feet and other foreign material are crushed as they pass between the disc 33 and the shaft 40.

A second spray of water impinges against the disc 33 below the shaft 40 washing the debris from the disc 33. The cleaning brush 63 past which the disc 33 moves completes the removal of any embedded materials from the face of the disc 33.

As the shrimp meats, now thoroughly cleaned, pass beyond the center of the disc 33 along the shaft 40, the action of the disc 33 reverses with relation to the shrimp meats and the meats are caused to ride up onto the guide plate 60 along the surface 62. The shrimp meats are discharged into any suitable conveyor or chute (not shown) from a point adjacent the end of the shaft 40 carrying the reduced end portion 41.

It is contemplated that apparatuses such as that described above may be operated in series so that the shrimp meats pass through two complete cycles prior to being discharged for packing.

A modified construction is illustrated in Figures 9 through 11 wherein a shaft 40' cooperates with an endless belt 33' in the same general manner that the shaft 40 cooperates with the disc 33. No specific mountings are shown for the modified structure illustrated in Figures 9 through 11 since conventional mounting structures would be used for this purpose.

Having thus described the preferred embodiments of the invention, it should be understood that numerous other structural modifications and adaptations may be resorted to without departing from the scope of the appended claims.

What is claimed is:

1. A seafood processing apparatus comprising a base, a rotating disc supported on said base, an abrading surface formed on said rotating disc, a shaft positioned adjacent to but spaced apart from said disc supported on said base, a knurled surface formed on said shaft, said shaft and said disc each rotating so that the respective surfaces thereof move oppositely to each other for a portion of the length of said shaft and in the same direction for a portion of the length of said shaft, and means on said base for guiding seafood so as to simultaneously contact the knurled surface of said shaft and the abrading surface of said disc.

2. A device as claimed in claim 1 wherein said base is sloped and said disc and said shaft are mounted to extend at an angle thereacross.

3. A device as claimed in claim 1 wherein means mounted on said base are provided for cleaning said disc at a point below said shaft.

References Cited in the file of this patent
FOREIGN PATENTS
631,364    Germany _____ June 18, 1936